United States Patent [19]

Schmidt

[11] Patent Number: 4,606,668
[45] Date of Patent: Aug. 19, 1986

[54] AXIAL BALL JOINT FOR ARTICULATED LINKAGES IN MOTOR VEHICLES AND METHOD OF FABRICATING SAME

[75] Inventor: Andreas Schmidt, Meerbusch, Fed. Rep. of Germany

[73] Assignee: Lemforder Metallwaren AG., Fed. Rep. of Germany

[21] Appl. No.: 711,398

[22] Filed: Mar. 13, 1985

[30] Foreign Application Priority Data

Mar. 19, 1984 [DE] Fed. Rep. of Germany ....... 3409989

[51] Int. Cl.$^4$ ............................................. F16C 11/00
[52] U.S. Cl. .................................... 403/140; 403/133; 403/76; 29/149.5 B
[58] Field of Search .................. 403/76, 77, 133, 140; 29/149.5 B, 441

[56] References Cited

U.S. PATENT DOCUMENTS

| | | | |
|---|---|---|---|
| 1,693,748 | 12/1928 | Fiegel et al. | 29/149.5 B |
| 2,182,601 | 12/1939 | Venditty | 29/441 X |
| 2,361,046 | 10/1944 | Molly | 29/441 X |
| 3,377,681 | 4/1968 | Kuhn | 29/149.5 B |
| 4,478,531 | 10/1984 | Levinson et al. | 403/77 |

FOREIGN PATENT DOCUMENTS

| | | |
|---|---|---|
| 869221 | 5/1961 | United Kingdom . |
| 1485368 | 9/1977 | United Kingdom . |
| 2004321 | 3/1979 | United Kingdom . |

*Primary Examiner*—Andrew V. Kundrat
*Attorney, Agent, or Firm*—McGlew and Tuttle

[57] ABSTRACT

An axial ball joint is fabricated from a housing having a substantially cylindrical outer surface and a cylindrical cavity which ends at an opening defined by a rim portion of the housing. The rim portion has a larger accumulation of material than elsewhere on the housing so that the housing can be deformed radially inwardly into a portion of the opening. A ball part with a ball portion and shank is inserted into the opening. A resilient socket is provided around the ball as a lining for the cavity. Once the ball portion is seated in the cavity, the rim portion is deformed inwardly toward the shank to retain the ball portion in the cavity. In this way the ball part is inserted from the opening end of the cavity rather than from an opposite end as is known in the art.

9 Claims, 5 Drawing Figures

4,606,668

AXIAL BALL JOINT FOR ARTICULATED LINKAGES IN MOTOR VEHICLES AND METHOD OF FABRICATING SAME

FIELD AND BACKGROUND OF THE INVENTION

The present invention relates in general to the construction of ball joints and in particular to a new and useful axial ball joint construction which is particularly suited for use in a motor vehicle and which utilizes a housing having a rim zone which is thicker in its accumulation of material than areas of the housing deeper into a socket which is defined by the housing for accepting a ball of the ball joint. This thicker area is crimped inwardly to securely hold the ball in the socket.

German patent application No. 26 55 353 and German utility model No. 77 18 994 describe a joint of this kind. To assemble such a joint, the ball part is inserted by its ball portion and with a resilient socket, into a housing and then locked therein by bending the housing rim inwardly, so that the housing remains cylindrical on its outside, only is crimped in along its rim.

To mount a ball joint in a vehicle mechanically, the housing of the joint must be throughout cylindrical and have a round, angular, or irregular cross section, i.e. the housing must not have any portions which would protrude outwardly beyond a cylindrical contour, but must have the same cross sectional portions which recede inwardly therefrom.

The axial loading capacity of such a ball joint is given by the material strength of the bent-in housing rim, so that conventional axial ball joints having an outer cylindrical housing and a constant wall thickness on their rim, can be loaded only within narrow limits. The tear-out force acting in the axial direction of the joint shank encounters only limited opposition which is exerted by the end rim. In conventional designs, the material thickness in the rim zone is determined by the inside surface of the housing, which, before the accomplished assemblage, is also cylindrical, up the equatorial plane of the ball.

From German No. OS 27 58 906 (equivalent to U.K. patent application No. 2,004,321) and other references, axial joints are known in which the housing rim at the shank side is formed by a wall portion which is somewhat thicker than the main housing portion having a cylindrical surface. This increases the resistance to tearing out the ball part. These prior art joints, however, are assembled by inserting the ball part into the housing from the rear, which does not require a bending of the housing rim at the shank side.

SUMMARY OF THE INVENTION

The present invention is directed to a development of a joint of the above mentioned kind, substantially augmenting the tear-out resistance of the bent-in rim of the joint housing Accordingly an object of the present invention is to provide a method of fabricating an axial ball joint for articulated linkages in motor vehicles which comprises forming a metallic housing having a substantially cylindrical outer surface and a cylindrical cavity which has an opening defined at a rim portion of the housing which rim portion includes an accumulation of material that is larger than the housing at locations deeper into the cavity, inserting a ball part having a ball portion and a shank portion, into the cavity through the opening, providing a resilient socket between the ball portion and the housing, and forcing the rim portion of the housing radially inwardly and partly around the ball portion adjacent its connection to the shank portion for retaining the ball part in the cavity.

A further object of the present invention is to provide an axial ball joint for articulated linkages in motor vehicles which comprises a ball part including a shank and ball portion, a socket of resilient material embracing the ball portion with the ball portion and socket disposed within the cavity of a metallic one piece housing, the cavity being shaped to preclude movement of the ball portion and socket axially in one direction deeper into the cavity, the housing having a rim portion with an accumulation of material which is thicker than locations elsewhere of the housing and in the cavity, the rim portion being bent inwardly towards the shank for retaining the ball portion and socket in the cavity and precluding movement of the ball portion and socket in an opposite direction out of the cavity.

Due to these features, the free space adjacent the ball portion is utilized to provide a material accumulation, which is thus provided just in the zone where the axial tensional or tearing forces become effective, so that considerably higher limit values of the tear-out forces under axial load are obtained. In spite of that, the housing remains cylindrical, with a smooth outer surface, since the material accumulation on the housing rim is pressed by the rim bending operation inwardly, into the free space adjacent the ball portion. Such a ball joint can be mounted in the vehicle fully or partly automatically, in the usual way, by means of a mechanical auxiliary equipment, for example, gripping tools. The axial loading capacity of the ball joint in the tear-out direction, however, is much larger than in prior art designs.

A further object of the invention is to provide a ball joint which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following, embodiments of the invention are described in more with reference to the drawing in which.

DESCRIPTION OF THE PREFERRED EMBODIMENTS

Figure 1:
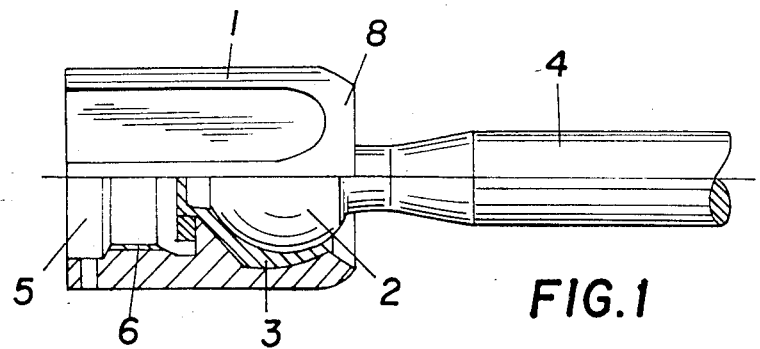
FIG. 1 is a partly sectional side view of an inventive joint.

Referring to the drawings in particular, the invention embodied therein comprises a method of fabricating an axial ball joint, and the axial ball joint itself, which is particularly suited for articulated linkages in motor vehicles.

Figure 2:
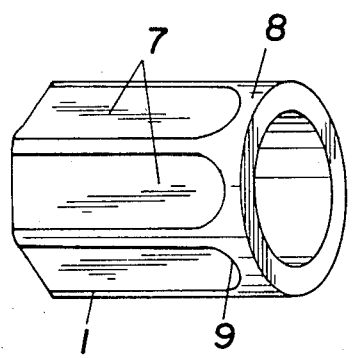
FIG. 2 is a perspective view of the joint of FIG. 1, before assemblage.

The joint is assembled of a one piece housing 1, a socket 3 of a resilient material, and a ball part comprising a ball portion 2 seated in the socket 3, and a shank portion 4 which protrudes from housing 1 and may be connected to a linkage or the like. At its side remote from the shank, housing 1 is provided with means for being connected to another part or linkage. Shown is a cavity or recess 5 and an inside thread 6 to be screwed to the end of another part. The cavity is shaped to preclude movement of the ball and socket axially further into the cavity, i.e. to the left in FIG. 1. After the finished assemblage, housing 1 is cylindrical and smooth on its outside, with a constant cross section. FIG. 2 shows a housing which initially had throughout a round i.e. cylindrical cross section and was partly flattened by spaced parallel planar portions or strips 7. Planar portions 7 do not extend up to the rim portion 8 of the housing, so that they shallow out to a rounded boundary 9. This constitutes an outwardly protruding accumulation on the housing rim 8 at the shank side relative to the remaining extension of the housing. While locking the joint after inserting portion 2 into socket 3, this material accumulation is bent inwardly as shown in FIG. 1, so that the outer surface of housing 1 becomes throughout cylindrical again, as needed in an operation for mounting the joint in a vehicle by means of an automatic or semi-automatic auxiliary equipment.

Figure 3:
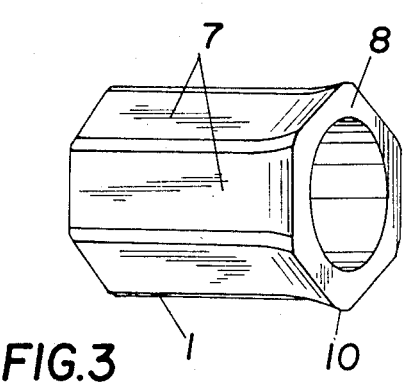
FIG. 3 is a similar view showing another embodiment of the housing, also before assemblage.
Figure 4:
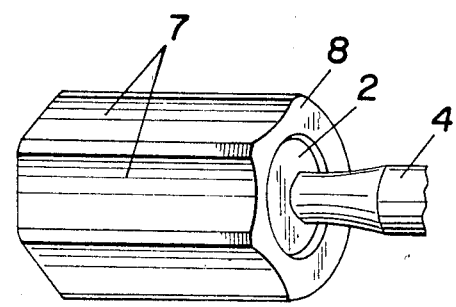
FIG. 4 shows the same housing after assemblage.
Figure 5:
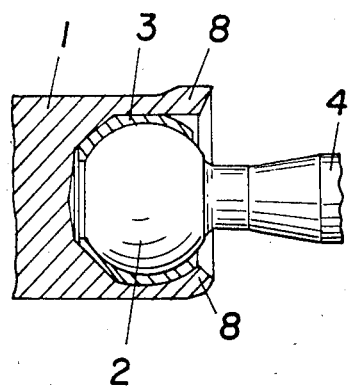
FIG. 5 is a partly sectional view of another embodiment.

In the example of FIG. 3, housing 1 has an outwardly protruding material accumulation 10 in the rim zone 8. Planar portions 7 extend arcuately outwardly, up to the edge. While locking the joint, the material accumulation is pressed inwarly so that planar portions 7 straighten out and the housing surface, or circumscribed surface, become cylindrical as shown in FIG. 4. A similar embodiment is shown in FIG. 5. Instead of providing planar portions 7, a housing with a circular cross section and a material accumulation in the rim zone 8 may be provided. In FIG. 5 above, the shape prior to the locking operation is shown, while FIG. 5 below shows the shape after locking, i.e. after thickened rim 8 has been bent in.

In another modification of the invention, the housing may be forced through a sizing sleeve so that a material accumulation is obtained in the rim zone 8 which is then bent in into the space adjacent ball portion 2. Or still in another way, the housing rim may be thickened by axial upsetting or its diameter may be reduced by suitable forming tools.

While specific embodiments of the invention have been shown and described in detail to illustrate the application of the principles of the invention, it will be understood that the invention may be embodied otherwise without departing from such principles.

What is claimed is:

1. An axial ball joint for articulated linkages in motor vehicles, comprising a ball part including a shank and a ball portion, a socket of a resilient material embracing the ball portion, and a one-piece metallic, outwardly substantial cylindrical housing having a frontal opening through which the ball portion and socket are inserted in a first direction and from which the shank protrudes, and defining a cavity in which the ball portion and socket are disposed, the cavity being shaped to preclude movement of the ball portion and socket further in the first direction, the ball portion and socket being held in place in the housing cavity by a radially inwardly bent rim of the housing, the housing having a rim zone close to the shank with a material accumulation, so that in this rim zone, at least over a part of a circumference of the rim, the housing wall is thicker than in an axially adjacent zone remoter from the rim of the housing such that the rim is bent only radially in toward the shank to hold the ball portion in the cavity, the material accumulation being displaced only radialy into a zone within a cross sectional area of the outer substantially cylindrical surface of the housing.

2. A joint according to claim 1, wherein the housing has a cylindrical outer surface which has flattened axially extending planar portions, the planar portions terminating short of the housing rim at the shank side thereof, and being blend into a circular outer surface of the housing.

3. A joint according to claim 1, wherein the housing is initially shaped with axially extending spaced-apart ridges protruding at least in the rim zone of the housing, from the cylindrical surface thereof, and which, after inserting the ball portion and socket, are bent in, inwardly of the cylindrical outer surface of the housing, to embrace and retain the inserted ball portion and socket.

4. A method of fabricating an axial ball joint for articulated linkages in motor vehicles, comprising:
   forming a one-piece metallic housing having a substantially cylindrical outer cavity with an opening defined at a rim portion of the housing which includes an accumulation of material that is larger than that at locations deeper into the cavity opening;
   forming circumferentially spaced flat planar areas on the outer surface of the housing;
   providing a ball part having a ball portion and a shank portion extending from the ball portion;
   providing a socket of resilient material between the ball portion and the housing;
   inserting the ball portion into the cavity through the opening with the socket being between the ball portion and the housing, in the cavity, the cavity having been shaped so as to preclude movement of the ball portion deeper into the cavity once the ball portion has been inserted through the opening into the cavity; and
   deforming the rim portion of the housing radially inwardly toward the shank and partly around the ball portion for retaining the ball portion in the cavity.

5. A method according to claim 4, including forming the plurality of circumferentially spaced planar portions on the outer surface of the housing so that they terminate before the rim portion of the housing.

6. A method according to claim 4, including forming the housing to have a rim portion which, before the deforming step, protrudes radially outwardly of a remainder of the outer surface of the housing.

7. A method according to claim 6, including forming the circumferentially spaced planar portions on the outer surface of the housing so as to have end areas lying over the rim portion of the housing which extend radially outwardly from a remainder of each planar portion, and deforming the rim portion radially inwardly so that the end portions become co-planar with the remainder of the planar portions.

8. A method according to claim 4, including forming the rim portion of the housing by axially upsetting the housing.

9. A method according to claim 4, including deforming the rim portion of the housing by passing the housing through a sizing sleeve.

* * * * *